F. L. H. SIMS.
CHARGING AND RECHARGING DEVICE FOR CARBID GAS GENERATORS.
APPLICATION FILED JULY 17, 1908.

929,032.

Patented July 27, 1909.

WITNESSES

INVENTOR
F.L.H. SIMS
By
Att'y's

UNITED STATES PATENT OFFICE.

FREDERICK LINDLEY HUNT SIMS, OF TORONTO, ONTARIO, CANADA.

CHARGING AND RECHARGING DEVICE FOR CARBID-GAS GENERATORS.

No. 929,032.      Specification of Letters Patent.      Patented July 27, 1909.

Application filed July 17, 1908. Serial No. 444,098.

*To all whom it may concern:*

Be it known that I, FREDERICK LINDLEY HUNT SIMS, of the city of Toronto, in the county of York, in the Province of Ontario, Canada, have invented certain new and useful Improvements in Charging and Recharging Devices for Carbid-Gas Generators, of which the following is the specification.

My invention relates to improvements in charging and recharging devices for carbid gas generators, and the object of the invention is to devise, where two connected carbid chambers are used in a machine in which the gas is under pressure, a means whereby the valve connecting the chambers will be insured of being closed before the feed opening is uncovered. To effect this object I have constructed the closing device in the manner which I shall presently describe.

Figure 2:
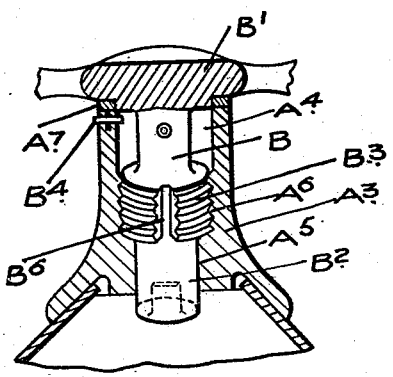
Figure 1:
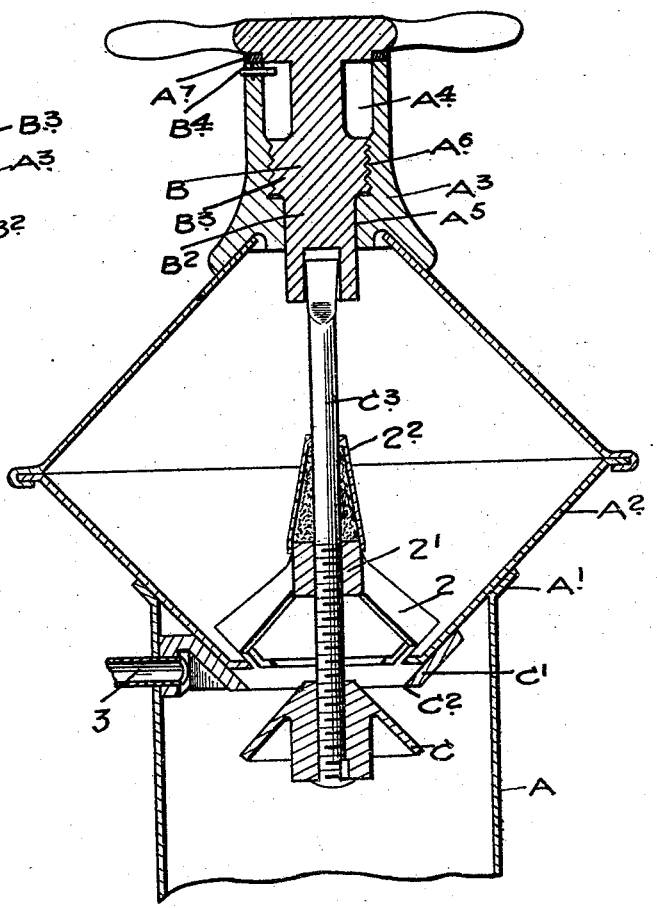
Figure 3:
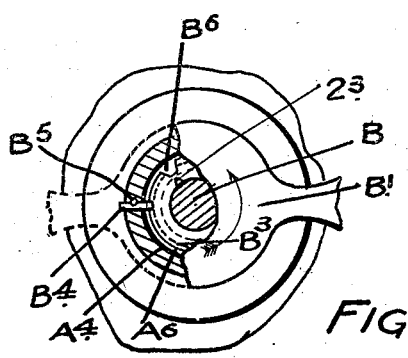

Figure 1, is a vertical section of the principal portion of a carbid gas generator showing the parts involved in my invention. Fig. 2, is a sectional view of the finial, the closing plug being mostly shown in section. Fig. 3, is a plan view of the finial partially in section.

In the drawings like characters of reference indicate corresponding parts in each figure.

A is the lower carbid chamber, which is tubular in form and connected to the upper carbid holder $A^2$ by a flanged upper end $A'$.

3 is a service pipe.

$A^3$ is a finial secured and extending through the top of the carbid holder $A^2$. The finial holder $A^2$ is provided with a large bore $A^4$ at the top. A smaller bore $A^5$ is provided, and an intermediate threaded portion $A^6$ of a diameter less than the bore $A^4$, but greater than the bore $A^5$.

B is a combined plug and box-wrench designed to enter the finial. The plug B is provided with a flanged head $B'$. The lower end $B^2$ of the plug is finished smooth to enter and fit the lower smooth portion $A^5$ of the finial. This portion $A^5$ of the finial must be carefully reamed to make a snug fit for the portion $B^2$ of the plug.

$B^3$ is an enlarged threaded portion of the plug B designed to fit but of less length than the threaded portion $A^6$ of the finial. Between the threaded portion $B^3$ and the head $B'$ the plug is cast considerably smaller in diameter to clear everything and avoid machine work.

The flanged head $B'$ is provided with handles or a hand wheel to facilitate the handling of the plug. A washer $A^7$ preferably of leather is provided and cemented to a seat turned beneath the plug head $B'$ and is adapted to form a gas-tight gasket when the plug is screwed home by resting on the smooth horizontal top of the finial.

$B^4$ is a steel pin extending through the finial into the space between the interior of the finial and the reduced upper portion of the plug. The pin $B^4$ is rigidly secured in place by means of a pin $B^5$ extending so as to pass through a notch formed in the pin $B^4$.

$B^6$ is a vertical slot cut through the threaded portion $B^3$ of the plug B.

$C'$ is a casting secured to the lower portion of the carbid chamber and forming a valve seat $C^2$ and provided with upwardly extending arms 2 terminating in a nut $2'$.

$2^2$ is a tapered sleeve, which fits the upper portion of the nut $2'$ and is provided with a filling of hemp, wool or other suitable material, which is designed to prevent the passage of grit or other foreign matter from the carbid onto the threaded valve spindle and the consequent wearing of the threads thereof.

$C^3$ is a rod which is disposed vertically and has a chisel-shaped upper end which extends into a corresponding hole in the bottom of the plug B, thereby forming with the plug B a box wrench device. The lower portion of the rod $C^3$ is threaded and has rigidly secured at the end thereof the conical check valve C.

The pin $B^4$ is located in such a position that when the plug is unscrewed and all the male thread $B^3$ of the plug B is out of the female thread $A^6$ in the finial $A^3$ the inner projecting end of the steel pin $B^4$ shall engage with the upper surface of the said male thread on the plug B to prevent the plug being withdrawn. The male thread on the plug B is arranged to quit in the female thread in the finial $A^3$ about a quarter of a turn before the check valve C is tightened on its seat. In order to seat the check valve tight the plug is still turned until the pin $B^4$ is opposite the slot $B^6$, the location of the slot being indicated by the projecting pin $2^3$, thereby insuring the valve C being seated tight, and also allowing of the withdrawal of the plug. This construction prevents the withdrawal of the plug from the finial until the check valve is closed tight, thus preventing any escape of gas, and the danger incident thereto and, therefore, the taking hold of the spindle C³ until the plug has been inserted sufficiently far to insure of the smooth lower end B² engaging with the bore A⁵ in which it is fitted is prevented. It is to be specially noted that until the plug is withdrawn the fitted portions effectually prevent any escape of the gas.

What I claim as my invention is:

1. In a closing device for carbid gas generators, the combination with the carbid chamber and carbid holder superimposed thereon and provided with a suitable bottom orifice, of a conical valve and valve rod threaded at the lower end, and a casting connected to the lower end of the carbid holder and provided with a web and a central nut through which the threaded rod extends, a closure for the top of the carbid holder, means connecting such closure to the valve stem, whereby previous to the closure being released and withdrawn the valve is closed tight on its seat, and a hollow thimble surrounding the valve stem above the nut and a suitable filling for the thimble as and for the purpose specified.

2. In a closing device for carbid gas generators, the combination with the carbid chamber and carbid holder superimposed thereon and provided with a suitable bottom orifice, of a conical valve and valve rod threaded at the lower end and provided with a non-circular upper end and a casting connected to the lower end of the carbid holder and provided with a web and a central nut through which the threaded rod extends, a finial at the top of the carbid chamber having an upper and lower internal smooth portion of which the upper is of greater diameter, a closing plug having a lower smooth portion adapted to fit the lower portion of the finial and an intermediate threaded portion adapted to fit the threaded portion of the finial and a reduced upper portion and handle and means for preventing the withdrawal of the plug when unscrewed previous to the valve being brought home to its seat and yet allowing of the withdrawal when the valve is tightened as and for the purpose specified.

3. In a closing device for carbid gas generators, the combination with the carbid chamber and carbid holder superimposed thereon and provided with a suitable bottom orifice, of a conical valve, and valve rod threaded at the lower end and provided with a non-circular upper end and a casting connected to the lower end of the carbid holder and provided with a web and a central nut through which the threaded rod extends, a finial at the top of the carbid chamber having an upper and lower internal smooth portion of which the upper is of the greater diameter, a closing plug having a lower smooth portion adapted to fit the lower portion of the finial and an intermediate threaded portion adapted to fit the threaded portion of the finial and a reduced upper portion and handle the screw thread being provided with a vertical slot and a pin extending through the upper portion of the finial and co-acting with the slot as and for the purpose specified.

4. In a closing device for carbid gas generators, the combination with the carbid chamber and carbid holder superimposed thereon and provided with a suitable bottom orifice, of a conical valve and valve rod threaded at the lower end and provided with a non-circular upper end and a casting connected to the lower end of the carbid holder and provided with a web and a central nut through which the threaded rod extends, a finial at the top of the carbid chamber having an upper and lower internal smooth portion of which the upper is of the greater diameter, a closing plug having a lower smooth portion adapted to fit the lower portion of the finial and an intermediate threaded portion adapted to fit the threaded portion of the finial and a reduced upper portion and handle, the screw thread being provided with a vertical slot and a pin extending through the upper portion of the finial and co-acting with the slot and a projection on the upper portion of the plug in line with the slot in the front thread of the plug as and for the purpose specified.

5. In a carbid gas machine, the combination with the carbid holder, check valve and threaded stem therefor journaled in the bottom of the holder, of a finial located on the top of the holder and having a central bore provided with an intermediate threaded portion, a pin extending through the finial, a screw plug having an intermediate threaded portion and having a vertical slot cut therein and engaging means between the bottom of the plug and the stem of the check valve as and for the purpose specified.

FREDERICK LINDLEY HUNT SIMS.

Witnesses:
  B. BOYD,
  A. THOMAS.